US008852784B2

(12) United States Patent
Wu et al.

(10) Patent No.: US 8,852,784 B2
(45) Date of Patent: Oct. 7, 2014

(54) SELF-ALIGNMENT AND SHOCK IMPACT RELIEF BATTERY CONNECTOR (75) Inventors: Wen-Sung Wu, Tucheng (TW); Meng-Chang Liu, Puli Township (TW); Shen-Yuan Chien, Taipei (TW)

(73) Assignee: Schneider Electric IT Corporation, West Kingston, RI (US)

( * ) Notice: Subject to any disclaimer, the term of this patent is extended or adjusted under 35 U.S.C. 154(b) by 1070 days.

(21) Appl. No.: 12/386,034

(22) Filed: Apr. 13, 2009

(65) Prior Publication Data

US 2010/0261045 A1 Oct. 14, 2010

(51) Int. Cl.
H01M 2/20 (2006.01)
H01M 2/30 (2006.01)
H01R 11/28 (2006.01)

(52) U.S. Cl.
CPC .............. *H01R 11/287* (2013.01); *H01M 2/30* (2013.01); *H01M 2/202* (2013.01); *H01R 11/282* (2013.01); *H01M 2/20* (2013.01)
USPC ................................ 429/121; 429/98; 429/99

(58) Field of Classification Search
CPC ........ Y02E 60/12; H01M 2/20; H01M 2/202; H01M 2/30
USPC ....................... 429/98, 99, 121; 439/627, 892
See application file for complete search history.

(56) References Cited

U.S. PATENT DOCUMENTS 6,276,960 B1 8/2001 Schaefer et al.
7,025,597 B1* 4/2006 Chang .............................. 439/39
7,157,180 B2* 1/2007 Lui et al. ........................ 429/100
7,855,548 B2* 12/2010 Engel ............................. 324/156
2005/0042936 A1* 2/2005 Perry ............................. 439/757

FOREIGN PATENT DOCUMENTS

DE 199 24 868 A1 11/2000
WO WO 2010/120339 A2 10/2010

OTHER PUBLICATIONS

Invitation to Pay Additional Fees and, Where Applicable, Protest Fee for Int'l Application No. PCT/US2010/000936, Date Mailed: Aug. 26, 2010.
Notification of Transmittal of the International Search Report and the Written Opinion of the International Searching Authority for Int'l Application No. PCT/US2010/000936, Date Mailed: Nov. 17, 2010.
International Preliminary Report on Patentability, PCT/US2010/000936, date of mailing Oct. 27, 2011.

* cited by examiner

*Primary Examiner* — Ula C Ruddock
*Assistant Examiner* — Scott J Chmielecki
(74) *Attorney, Agent, or Firm* — Hamilton, Brook, Smith & Reynolds, P.C.

(57) ABSTRACT

Methods and apparatus supporting an electrical connection are disclosed. Systems previously equipped with wire interfaces, such as battery terminals, can be equipped with a connector assembly to significantly reduce a hazard of electrical shock to a user. The connector assembly includes a stress relief component that attenuates a force, applied to the stress relief component, to reduce its effect on the connector assembly. By attenuating the force, the connector assembly maintains a substantially fixed position relative to the battery pack component and mitigates a potential for disruption in electrical connectivity. Techniques disclosed herein benefit users of battery packs or other devices as well as manufacturers by increasing safety, reliability, and ergonomics.

19 Claims, 12 Drawing Sheets

SELF-ALIGNMENT AND SHOCK IMPACT RELIEF BATTERY CONNECTOR

BACKGROUND OF THE INVENTION

Battery connection systems are known in the art to connect a variety of devices to batteries in order to draw power. A simple battery connection system uses electrical wire to conduct electricity between terminals of a battery and a device, respectively. Typically, a pair of wires is attached to respective positive and negative terminals of the battery and the device.

SUMMARY OF THE INVENTION

An embodiment of the invention is a connector assembly including a plate having an upper surface and a lower surface and defining an opening extending between the upper surface and the lower surface. The connector assembly further includes a connector housing protruding below the lower surface of the plate and defining an interior of the connector housing. The interior defines a socket extending below the opening. The connector assembly further includes a stress relief component coupled to the plate to decouple a force applied to the stress relief component from the plate.

The connector assembly may further include at least one first electrical terminal in the socket configured to couple electrically with at least one second electrical terminal of a battery pack component while the connector assembly is engaged with the battery pack component. The connector housing component may include multiple connector housing members, each including a corresponding electrical terminal.

The stress relief component may include multiple stress relievers each in common arrangement above, below, or in a plane of the plate. The socket may be positioned between the multiple stress relievers. The stress relievers may be configured to provide a retention force to maintain the plate in a substantially fixed position in a plane of the plate. The stress relievers may be configured to provide the retention force by abutting at least one positioning member on a element adjoining the plate when the connector assembly is engaged with the battery pack component.

In some embodiments, the connector housing may further protrude above the upper surface of the plate.

Another embodiment is a method of supporting an electrical connection. The method includes facilitating passage of an electrical conductor from an upper surface of a plate to a socket defined by a connector housing on a lower surface of the plate and attenuating a force attempting to act on the plate to mitigate a potential for disruption in electrical connectivity between the electrical conductor and another electrical conductor associated with the socket. The method may also include supporting an electrical coupling, at the socket, between a first electrical terminal of the connector housing and a second electrical terminal associated with a structure to which the connector housing mates.

Attenuating the force may include decoupling the force, applied to a stress relief component joined to the plate, from the plate. Attenuating the force may include providing a retention force by multiple stress relievers each in common arrangement above, below, or in a plane of the plate. The socket may be positioned between the stress relievers.

A further embodiment is a battery pack comprising a battery pack component and a connector assembly configured to be engaged with the battery pack component. The connector assembly includes a stress relief component configured to attenuate a force from the connector assembly in a manner maintaining a position of the connector assembly relative to the battery pack component. The stress relief component is also configured to mitigate a potential for disruption in electrical connectivity of an electrical interface between the connector assembly and the battery pack component while the connector assembly is engaged with the battery pack component.

The connector assembly may be configured in embodiments presented above. For example, the stress relief component may include multiple stress relievers each in common arrangement above, below, or in a plane of the plate. The stress relievers may be configured to provide a retention force to maintain the connector assembly in a substantially fixed alignment relative to the battery pack component.

The connector assembly may include at least one first electrical terminal configured to couple electrically with at least one second electrical terminal of the battery pack component to provide electricity to an electrical interface between the first and second electrical terminals.

The battery pack component may include a chamfer to align the connector assembly with the battery pack component during engagement of the connector assembly with the battery pack component.

Another embodiment of the invention is a method of providing battery power to an electrical device. Electricity is provided to an interface between a connector assembly and a battery pack component to provide battery power to the electrical device. A force attempting to act on the connector assembly is attenuated in a manner that maintains a position of the connector assembly relative to the battery pack component to mitigate potential for disruption of the electrical connection The method may further include providing a retention force to maintain the connector assembly in a substantially fixed alignment relative to the battery pack component.

The method may further include aligning the connector assembly and the battery pack component during mating to guide a first connector housing of the connector assembly to a desired alignment position relative to a second connector housing of the battery pack component Attenuating the force may include decoupling the force, applied to a stress relief component joined to a plate of the connector assembly, from the plate.

Use of embodiments of the connector assembly or corresponding method significantly reduces or eliminates a potential of transmitting an electric shock to a user during electrical connection of electrical devices to each other.

Another embodiment is a battery pack component that has a first housing structure configured to secure a battery and a second housing structure that has a first electrical terminal electrically coupled to the battery. The second housing structure is configured to receive a connector assembly, which includes a second electrical terminal, with sufficient mechanical play to enable stress relief related displacement effects between the second housing structure and the connector assembly while maintaining an electrical coupling between the first and second electrical terminals.

The second housing structure may further include a chamfer to align the connector assembly with the battery pack component automatically during engagement of the connector assembly with the battery pack component.

The displacement effects of mechanical shocks or other mechanical motions to the connector assembly or the battery pack component may be attenuated relative to the battery by stress relievers on the connector assembly that abut at least one positioning member.

The battery pack component may have the at least one positioning member integrated therewith.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

Connecting wires directly between a device and the terminals of a battery is a simple technique but is disadvantageous for several reasons. Handling wires directly can pose a hazard to the human user, because an electrical spark may occur on the first contact between the wires and the battery. Requiring users to secure electrical connections manually is inconvenient and may be cumbersome based on the spatial configuration of the device and the battery. Leaving wires exposed can result in a disruption of electrical connectivity if an external mechanical force dislodges a wire.

Mechanical assemblies are known to shield users from direct contact with wires through the use of an insulator (e.g., plastic) which protects the user. However, such assemblies are vulnerable to external mechanical shocks, which may disconnect the assembly from the battery and interrupt a flow of electricity. Such mechanical shocks, even if slight in magnitude, may also damage the assembly over time. A technique that provides shock impact relief is desirable.

Embodiments of the present invention address the foregoing deficiencies and provide techniques for connecting to a battery in a manner that increases usability and safety for users.

Figure 1A:
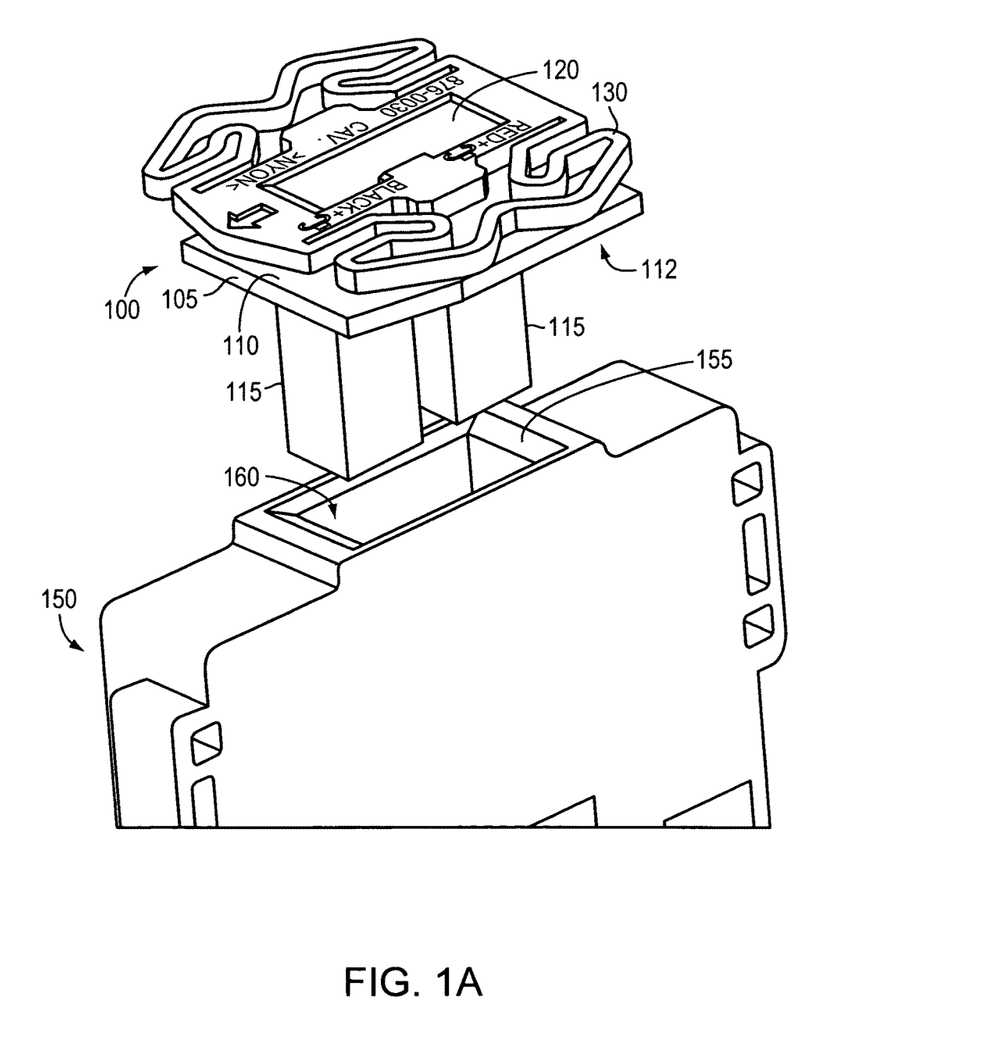
FIG. 1A is a perspective view of a connector assembly and a battery pack component in an embodiment of the invention.

FIG. 1A is a perspective view of a connector assembly 100 and a battery pack component 150 in an embodiment of the invention. A system including the connector assembly 100 and the battery pack component 150 is referred to as a battery pack. The connector assembly may be used as a bridge to connect a battery (represented by the battery pack component 150) to an external device (not illustrated). The battery pack component 150 may include a battery itself including one or more battery cells, which may be employed with a device such as an uninterruptible power supply (UPS), for example. Techniques disclosed herein for battery connection may be used in other electrical contexts as well.

The connector assembly 100 has a plate 105 which has an upper surface 110 and a lower surface 112. The plate 105 defines an opening extending between the upper surface 110 and the lower surface 112 to enable passage of an electrical conductor (not illustrated) therebetween. Part of the opening is illustrated in FIG. 1A as 120. The plate 105 is generally the largest piece of the connector assembly 100 oriented perpendicular to the direction of passage of the electrical conductor. The plate 105 is illustrated as planar in this embodiment but may be a curved surface or other surface that defines an opening extending between an upper surface 110 and a lower surface 112, in which case the "plane" of the plate 105 is said to be plane perpendicular to the passage of the electrical conductor. The plate 105 is generally a structure defining an opening to enable passage of an electrical conductor, as described above.

Protruding below the lower surface 112 of the plate is a connector housing 115, illustrated in FIG. 1A as two separate connector housing members 115 in one embodiment. In other embodiments, the connector housing 115 may be a single protrusion or may have more than two protruding members. In some embodiments, the connector housing 115 extends upward beyond the plate 105 as well as below it. In some embodiments, the connector housing 115 and the plate 105 are integrally formed, i.e., a single piece. The connector housing 115 defines an interior of the connector housing, with the interior defining a socket 120 extending below the opening defined by the plate 105. The socket 120 is generally a channel through which an electrical conductor may be routed to support the passage of electricity.

An electrical connection is established via the socket 120 when the connector assembly 100 (specifically the connector housing 115) is inserted into a cavity 160 of the battery pack component 150, which is configured to receive the connector housing 115. The connector housing 115 of the connector assembly 100 may be referred to as a first connector housing 115 and is said to insert into a corresponding second connector housing (illustrated in FIG. 3 as 360) in the battery pack component 150. The first connector housing 115 and the second connector housing may have respective male and female characteristics, e.g., a housing member 115 inserted into a cavity 160, as described above. In some embodiments, multiple connector housing members 115 have a polarity that enforces a particular orientation in which they may be inserted into the cavity 160. The first connector housing 115 may also have a female part configured to mate (couple) with a corresponding male part of the second connector housing 360, as discussed below in the context of electrical terminals. In other embodiments, the male/female attributes of the first connector housing 115 and the second connector housing 360 may be reversed.

The battery pack component may include a chamfer (bevel) 155 to align the connector assembly 100 with the cavity 160 of the battery pack component 150 automatically (a process referred to as self-alignment) while the connector assembly 100 is being engaged with the cavity 160 of the battery pack component 150. The chamfer 155 ensures that the user need not worry about alignment during insertion (mating) as with conventional technologies. The chamfer 155 enforces a particular alignment between the first connector housing 115 and the second connector housing 360, along a common vertical axis of both, that provides a reliable electrical connection upon engagement without careful manual operation or control. The connector assembly 100 may be said to mate with the battery pack component 150, and the mating may also be said to be between the first connector housing 115 and the second connector housing 360.

A stress relief component 130 is coupled to the upper surface 110 of the plate 105. "Coupled" in this context means joined, either directly or indirectly, so that the stress relief component 130 is configured to decouple a force, which may be applied to the stress relief component 130, from the plate 105, as further described below. In some embodiments, the stress relief component 130 is physically connected to the first connector housing 115 of the connector assembly 100, in which case it is indirectly coupled to the plate 105. The stress relief component 130, which is coupled to the plate 105, absorbs an applied force attenuates its magnitude and impact on the plate 105. Decoupling a force from the plate 105 serves to protect the plate 105 from mechanical wear and also to maintain the plate 105 in a substantially fixed position and orientation, i.e., with minimal change in position and orientation due to mechanical shock impact. Fixing the plate 105 in this way reduces the chance of the connector assembly 100 becoming dislodged from the battery pack component 150. Such a dislodging might result in a disruption in electrical flow with conventional technology. In alternative embodiments, the stress relief component 130 may be attached to an edge of the plate 105, bottom of the plate 105, or combination of any aspects of the plate 105.

The stress relief component 130 is illustrated in FIG. 1A as multiple stress relievers 130 on the upper surface 110 of the plate 105 in one embodiment. In this embodiment, the socket 120 is positioned between the stress relievers 130. In other embodiments, the stress relief component 130 includes a single stress reliever 130. The stress relief component 130 may be positioned around the socket 120, e.g., in a circular configuration with the socket 120 at the center. In other embodiments, stress relievers 130 may be positioned diagonally opposite the socket 120 or at ends of a line with the socket 120 between the ends. In some embodiments, stress relievers 130 may be polarized to orient in a particular direction or to allow a particular configuration during engagement.

The stress relievers 130 have a flexible, reticulating rib-like structure configured to yield to force without breaking. The stress relievers 130 are illustrated on a common side (upper surface 110) of the plate 105 in one embodiment, but they may be on opposite sides in other embodiments. The stress relievers relieve stress (force per unit area) in a plane parallel to the plate 105 by providing a retention force in a direction opposite to the applied force, resulting in a reduced net force applied to the plate 105. It should be understood by one of ordinary skill in the art that if a force not in the plane of the plate 105 (but not perpendicular to the plate 105) is applied to the stress relievers 130, a corresponding component (projection) of the force will be decoupled from the plate 105. Although a particular configuration of stress relievers 130 is illustrated in FIG. 1A, a person of ordinary skill in the art will understand that other varieties of stress relievers may be used to isolate the plate 105 from external mechanical forces. In particular, other varieties of stress relievers may act to decouple the plate 105 primarily from forces other than parallel to the plate.

In one embodiment, the connector assembly 100 is configured to insert at one end into the battery pack component 155 at the cavity 160, and the connector assembly 100 is configured to receive a device (not illustrated) that draws power at the other end. In some embodiments, the connector assembly 100 remains stationary, and the battery pack component is moved relative to the connector assembly 100. Either way, an electrical connection is supported between the battery (battery pack component 150) and the device by way of the connector assembly 100.

Figure 1B:
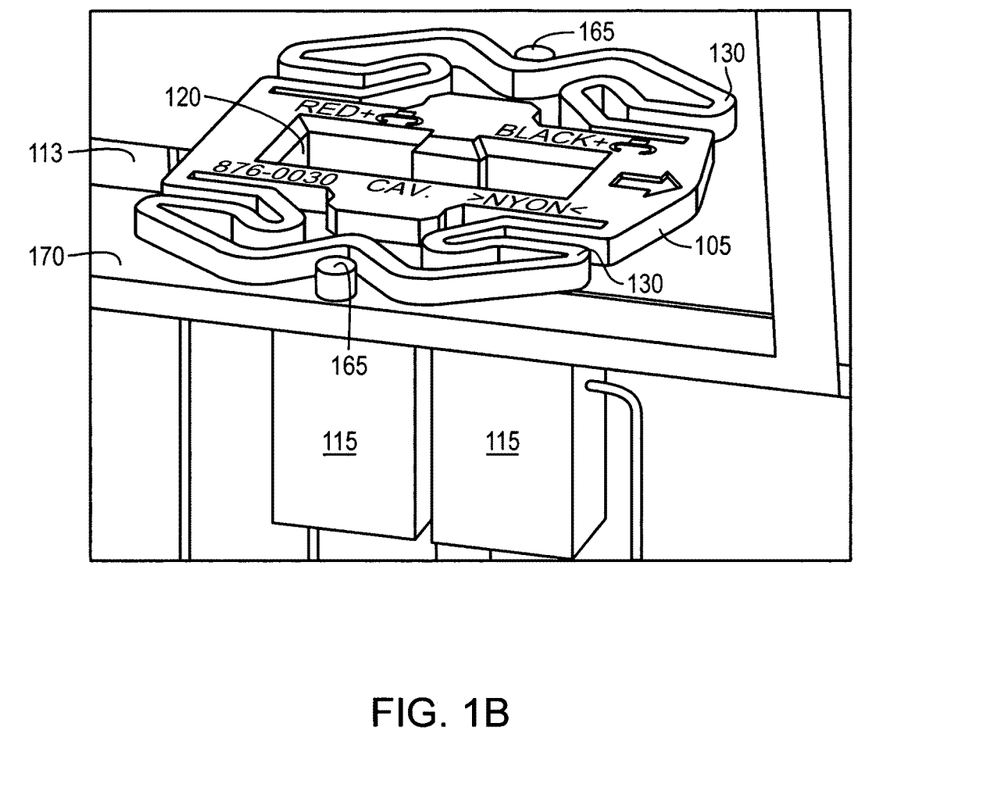
FIG. 1B is a perspective view of a connector assembly in an embodiment of the invention.

FIG. 1B is a perspective view of the connector assembly 100 in an embodiment of the invention in which the stress relievers 130 are coupled to an edge of the plate 105. In this embodiment, the connector assembly 100 is configured to slide along a slot 113 defined in a surface 170 that adjoins (but is not necessarily physically attached to) the plate 105 and that serves as a mounting chassis for the connector assembly 100. The connector assembly may be lowered into place at the end of the slot 113 so that the stress relievers 130 abut against a positioning member (or multiple positioning members, as illustrated in FIG. 1B) 165, thereby providing a retention force to maintain the position and alignment of the connector assembly 100. The positioning member (or multiple positioning members) may be on an element adjoining the plate 105 while the connector assembly 100 is engaged with the battery pack component 150. In another embodiment, the connector assembly 100 slides along the slot 113, e.g., compressing the stress relief component 130 to position the connector assembly 100 into place, without lowering being required.

Figure 1C:
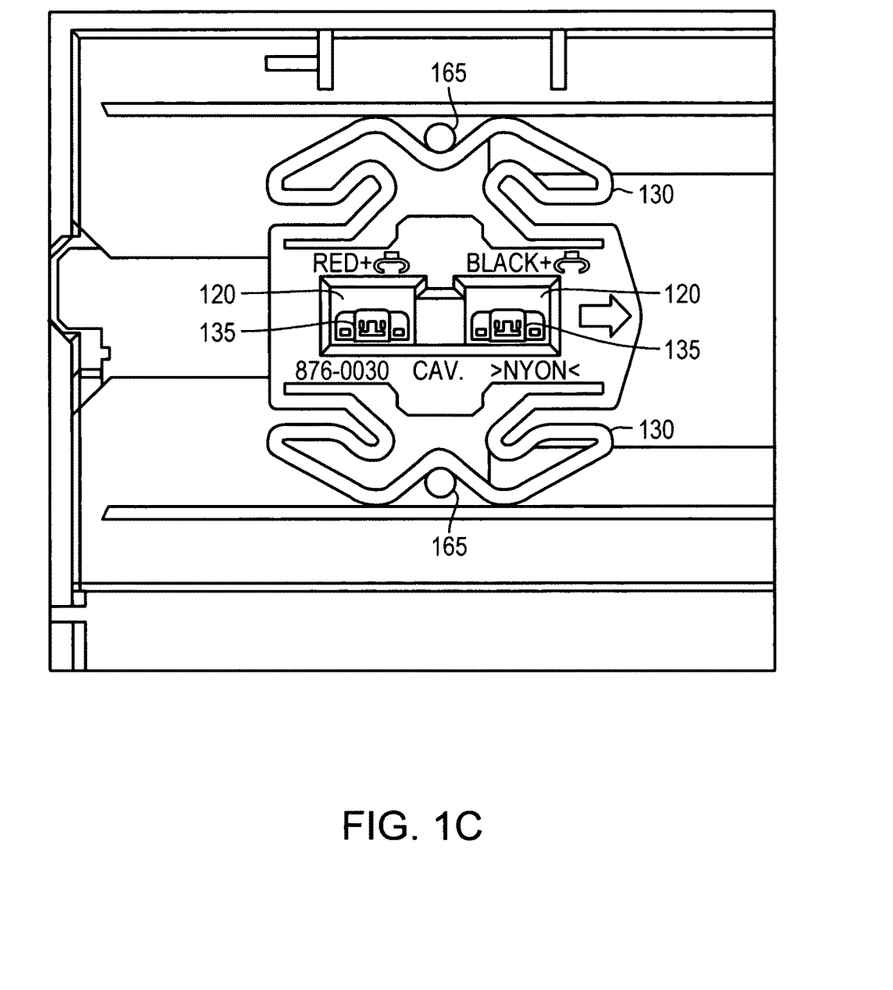
FIG. 1C is a top view of a connector assembly in an embodiment of the invention.

FIG. 1C is a top view of the connector assembly 100 in an embodiment of the invention. At least one first electrical terminal 135 is in the socket 120. The socket 120 is illustrated in this embodiment as having two parts that house respective positive and negative electrical terminals (generally 135). In this embodiment, positive and negative electrical terminals are in respective connector housing members 115. It is understood in the art that one or more first electrical terminals 135 may be used in the connector assembly 100 to support an electrical connection in embodiments of the invention, and multiple connector housing members 115 may be used accordingly. The connector assembly 100 is configured to receive a device from the upper surface 110 of the plate 105 via the socket, so that such a device can be electrically coupled to the first electrical terminal(s) 135.

Figure 2A:
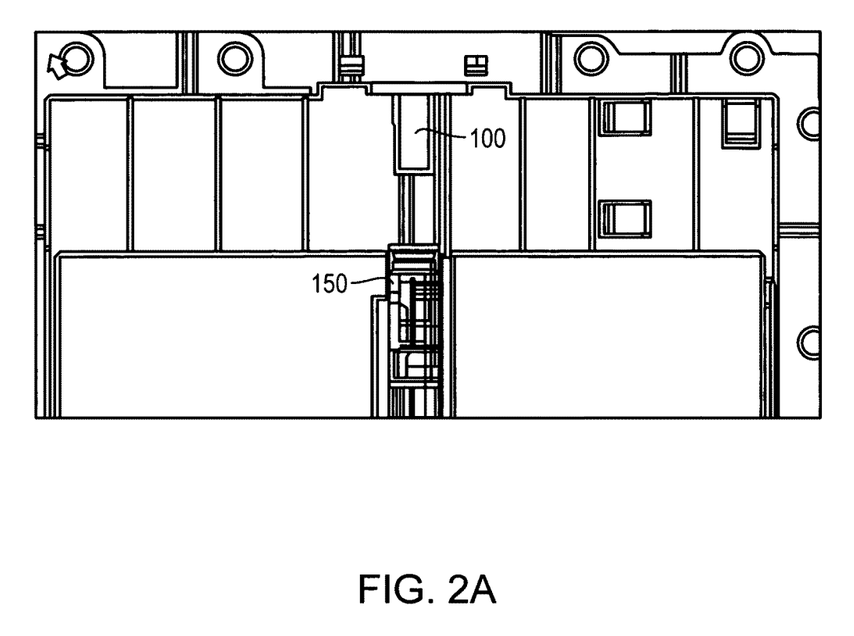
FIGS. 2A-C are side cutaway views of a connector assembly and a battery pack component at various stages of engagement in an embodiment of the invention: A) prior to engagement; B) start of engagement; C) engaged.
Figure 2B:
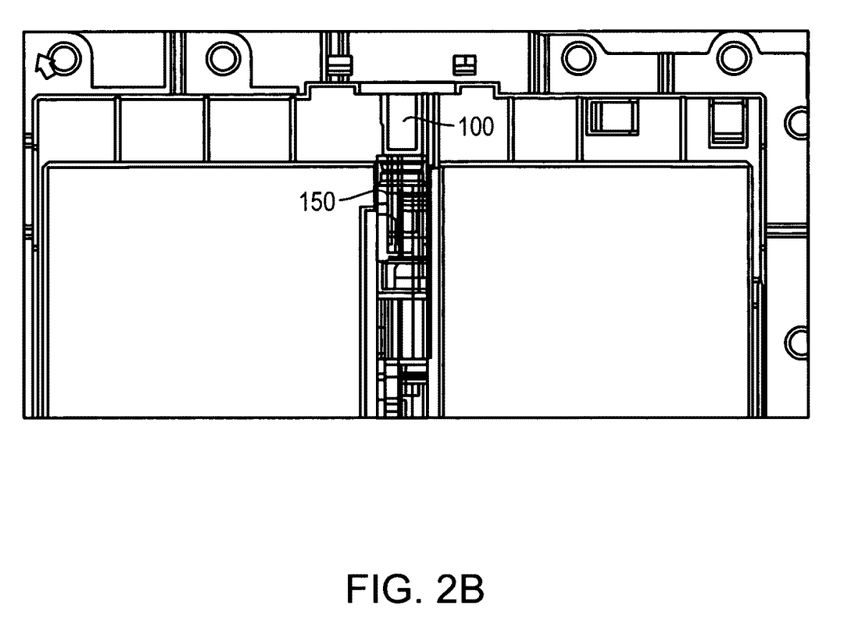
Figure 2C:
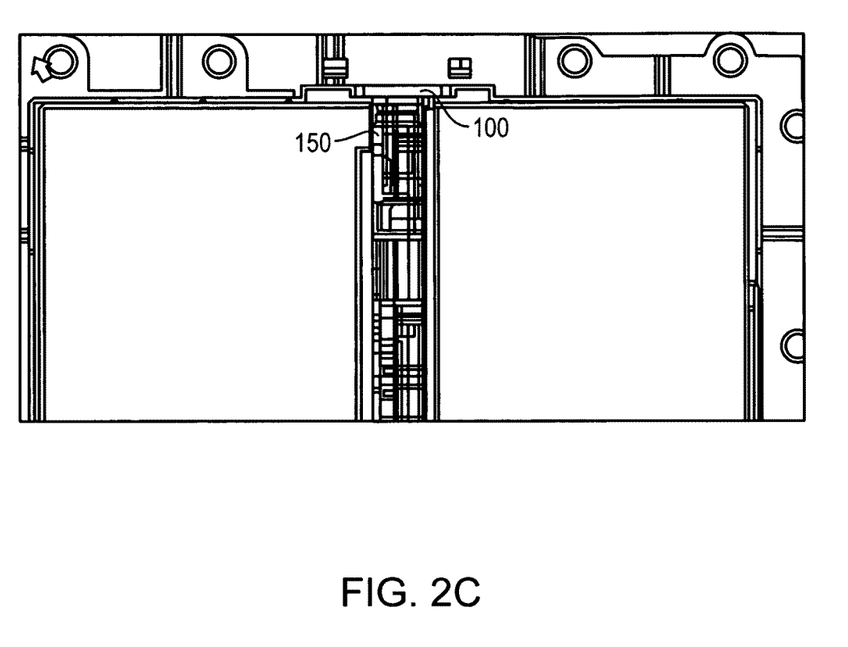

FIGS. 2A-C are side cutaway views of the connector assembly 100 and of the battery pack component 150 at various stages of engagement in an embodiment of the invention. FIG. 2A shows a configuration prior to engagement, when the connector assembly 100 might not be aligned with the battery pack component due to varying battery sizes or packing deviation. The chamfer 155 of the battery pack component 150 is designed to remedy such misalignment.

FIG. 2B shows the connector assembly 100 engaging with the battery pack component 150. In FIG. 2B, the connector assembly 100 was previously guided in to proper alignment for engagement by the chamfer 155 of the battery pack component 150.

FIG. 2C shows the connector assembly 100 engaged with the battery pack component 150. The alignment is maintained by the stress relief component 130 of the connector assembly 100.

Figure 3:
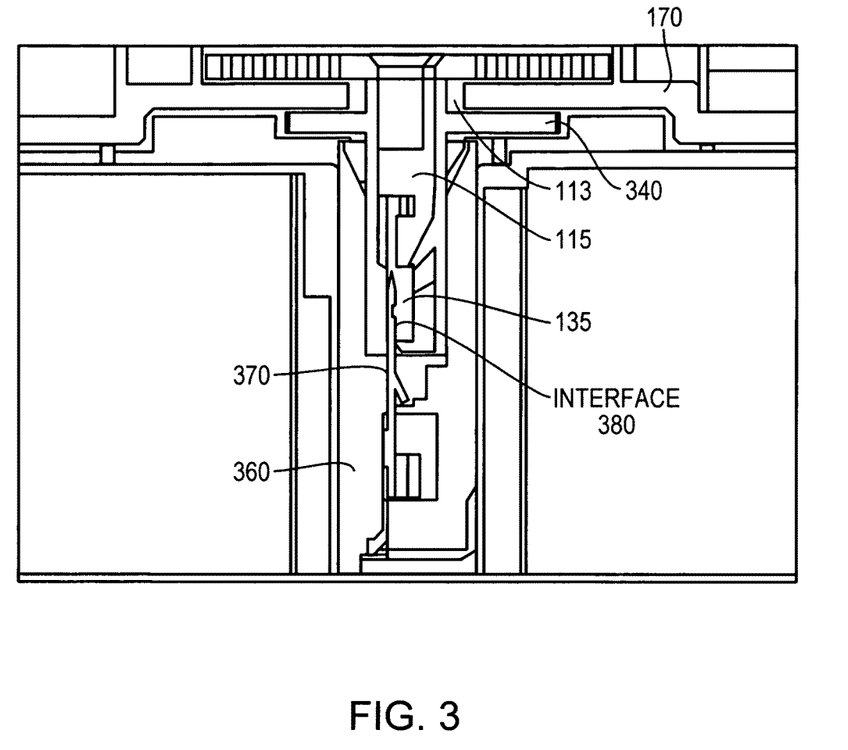
FIG. 3 is a side cutaway view of a connector assembly engaged with a battery pack component in an embodiment of the invention.

FIG. 3 is a side cutaway view of a connector assembly engaged with a battery pack component in an embodiment of the invention. The first connector housing 115 is configured to insert into (engage) a second connector housing 360 of the battery pack component 100 by sliding sideways, e.g., as in FIG. 1B. A fastening element 340 provides support during the sliding. One of ordinary skill in the art should recognize that there are numerous ways to design the fastening element 340.

In this embodiment, the first connector housing 115 enshrouds a second electrical terminal 370 of the battery pack component, thereby providing an electrical coupling and securing it, between a first terminal 135 and a second terminal 370. Thus, the first connector housing 115, while being essentially male in nature, may have a female part that receives a male part (the male part being the second terminal 370). A suitable mechanical means (not illustrated) for securing (locking) the male connector housing 115 to the female connector housing 360 in a fully engaged position may be provided. The electrical coupling is maintained by fixing the connector assembly 100 relative to the battery pack component 150 (specifically, the male connector housing 115 relative to the female connector housing 360), even in the event of an external mechanical force (shock), e.g., via the stress relief component 130. Thus, the connector assembly 100 provides shock impact relief. A suitable mechanical means (not illustrated) for disengaging the respective housings may be provided to disconnect the connector assembly 100 from the battery pack component 150. In some embodiments, it is sufficient to pull the connector assembly 100 and/or the battery pack component for disengagement.

Figure 4A:
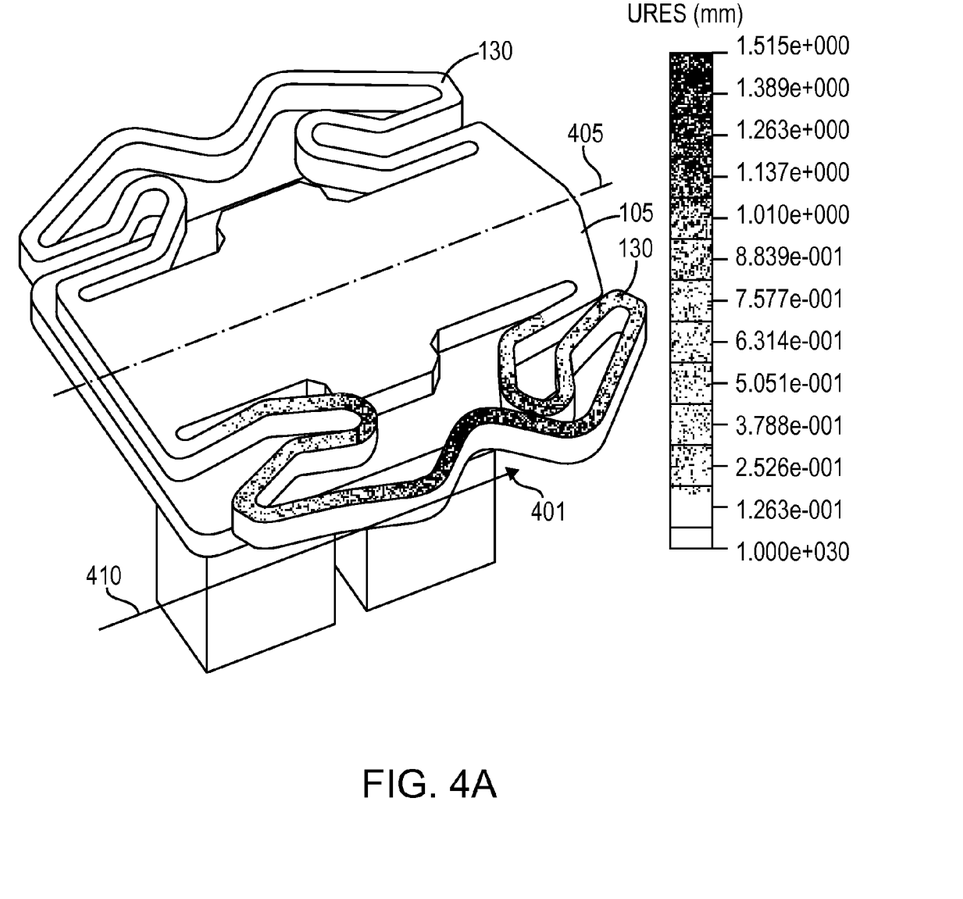
FIGS. 4A-B are force diagrams showing a stress relief component in an embodiment of the invention: A) longitudinal force; B) lateral force.
Figure 4B:
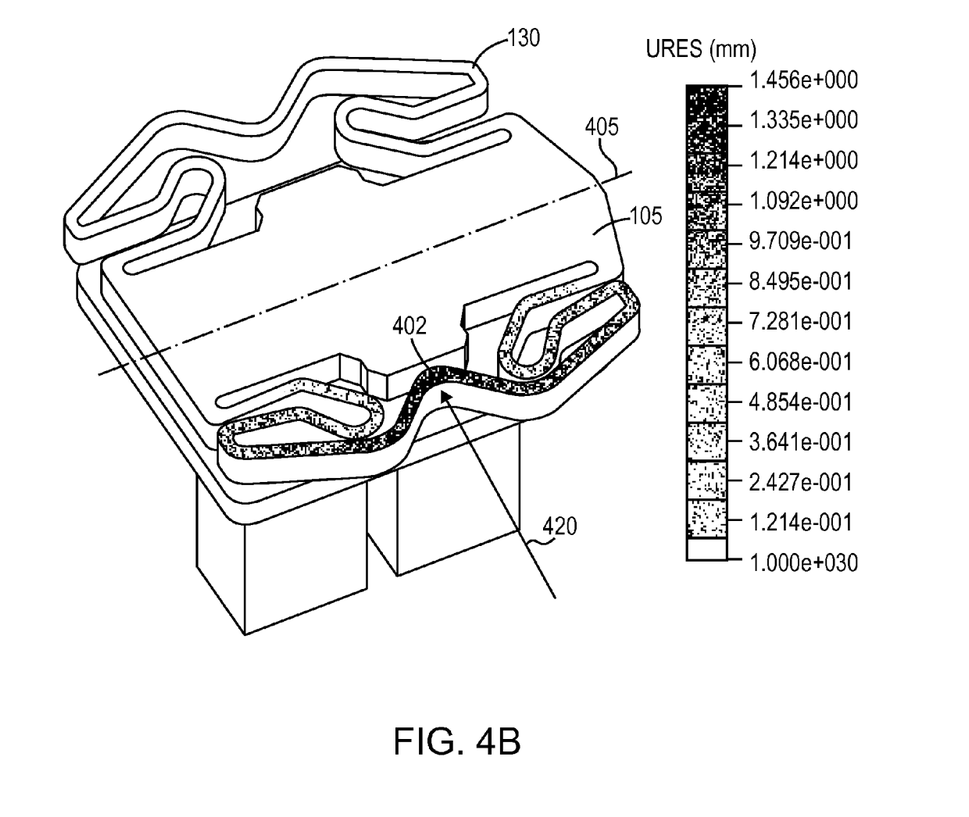

FIGS. 4A-B are force diagrams showing the stress relief component (depicted as a pair stress relievers) 130 in an embodiment of the invention. FIG. 4A shows that stress relievers 130 may yield (undergo positional displacement) due to an applied longitudinal force (i.e., a force parallel to a main axis 405 of the plate 105 as illustrated), so as to result in minimal or no displacement by the plate 105. In other words, the stress relievers 130 decouple a force applied to the stress relief component from the plate. Stated yet another way, the stress relievers 130 attenuate a force attempting to act on the plate. In this way, the stress relievers 130 mitigate a potential for disruption in electrical connectivity, e.g., between electrical conductors at the socket 120. FIG. 4A shows a particular computational simulation in which 26 N of force results in approximately 1.515 mm displacement at a particular point 401 on the stress relief component 130, with negligible displacement on the part of the plate 105. It should be understood that other force attenuation characteristics may be employed to relieve stress (force per unit area) on the connector assembly 100.

FIG. 4B shows a similar simulation result corresponding to a lateral force (i.e., a force transverse to a main axis 405 of the plate 105 as illustrated). In this example, 22 N of applied force results in 1.56 mm displacement of a particular point 402 on the stress relief component 130. One of ordinary skill in the art immediately understands that the stress relief component 135 attenuates forces acting in directions combining longitudinal and lateral aspects, since such forces can be broken up into respective components.

Figure 5:
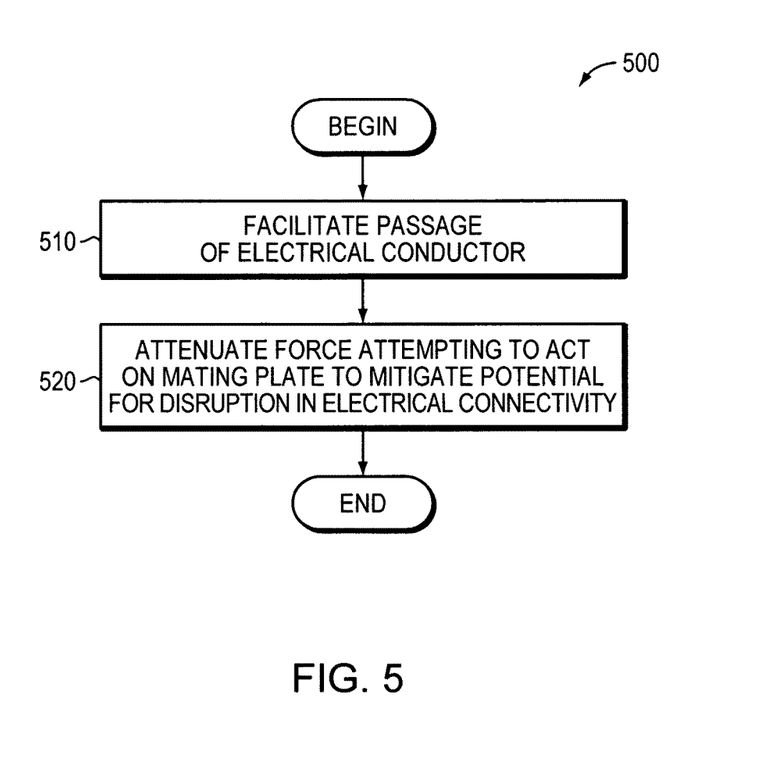
FIG. 5 is a flow diagram of an embodiment of the invention.

FIG. 5 is a flow diagram of an embodiment of the invention that is a method of supporting an electrical connection. After beginning process 500, passage of an electrical conductor is facilitated (510) from the upper surface 110 of plate 105 to the socket 120. A force attempting to act on the plate 105 is attenuated (520) to mitigate a potential for disruption in electrical connectivity between the electrical conductor and another electrical conductor associated with the socket 120. It should be understood that the force may be a longitudinal force 410, a lateral force 420, or another force with a component in the plane of the plate 105.

Figure 6:
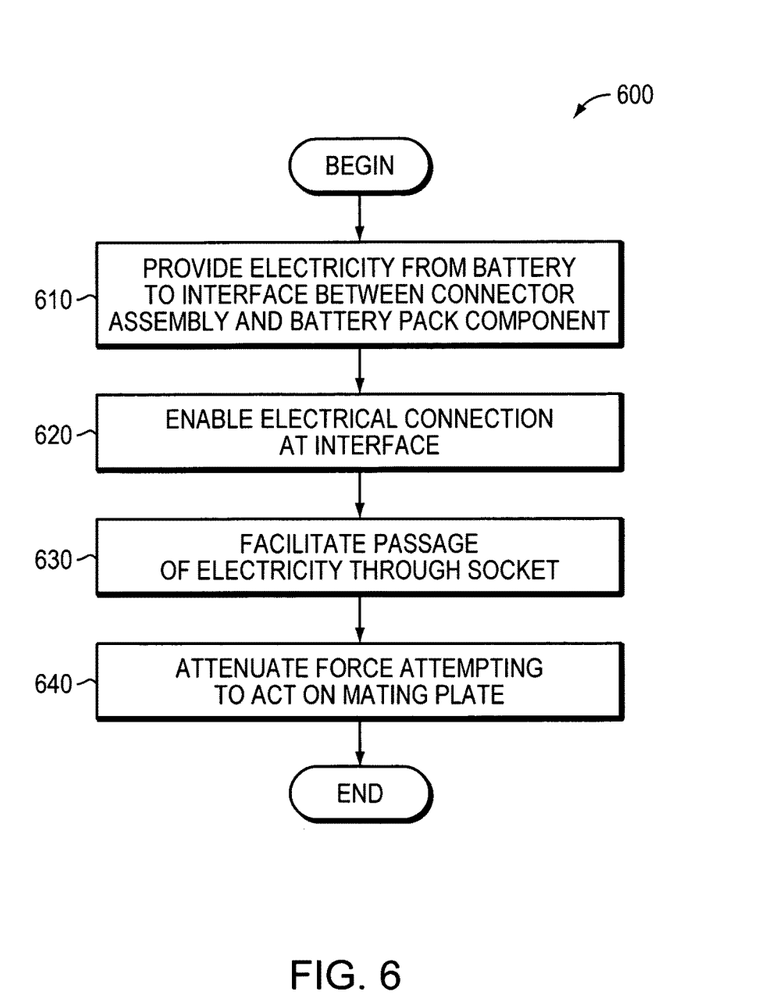
FIG. 6 is a flow diagram of another embodiment of the invention.

FIG. 6 is a flow diagram of another embodiment of the invention that is a method of supporting an electrical connection. After beginning process 600, electricity is provided (610) to an interface 380 between the connector assembly 100 and the battery pack component 150. The electricity is provided from a source within the battery pack component 150, e.g., a battery associated with the battery pack component 150. The electrical connection is enabled (620) at the interface 380 between a first electrical terminal 135 of the connector assembly 100 and a second electrical terminal 370 of the battery pack component. In some embodiments, less than one or more than one first electrical terminal is used, and less than one or more than one second electrical terminal is used. Passage of electricity is facilitated (630) from the first electrical terminal 135 through the socket 120 (not illustrated in FIG. 6). A force attempting to act on the plate 105 is attenuated (640) to mitigate a potential for disruption of the electrical connection.

Figure 7:
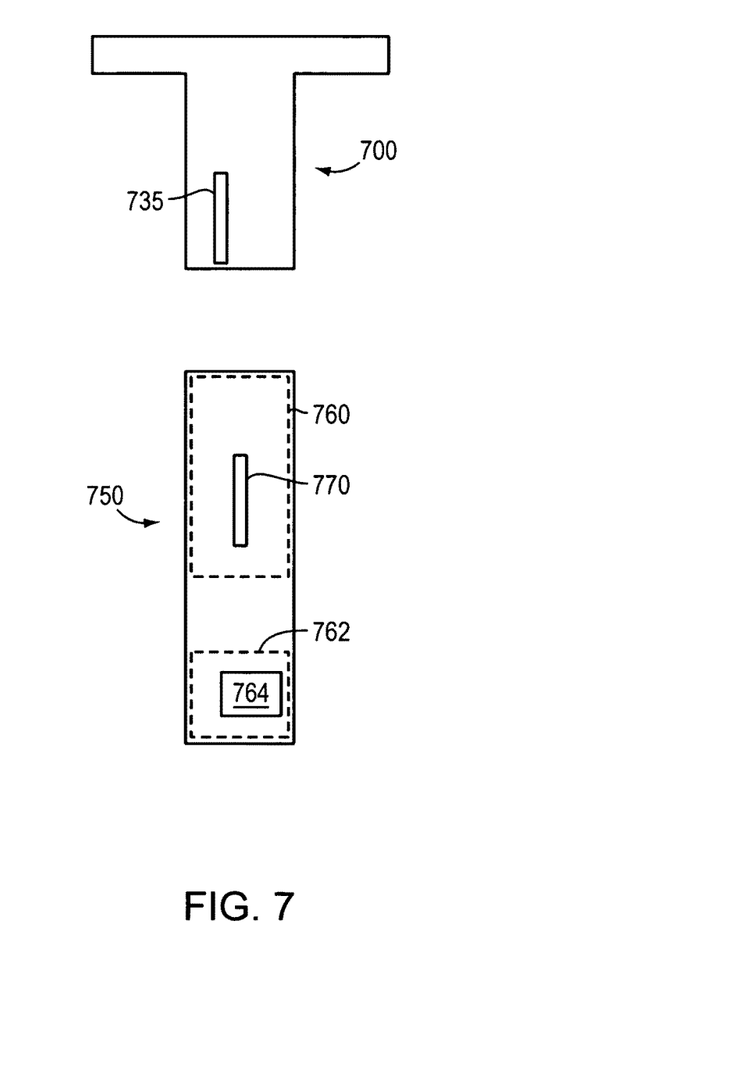
FIG. 7 is a side cutaway view of a battery pack component configured to receive a connector assembly in an embodiment of the invention.

FIG. 7 is a side cutaway view of a battery pack component 750 configured to receive a connector assembly 700 in an embodiment of the invention. The battery pack component 750 has a first housing structure 762 configured to secure a battery 764. The battery pack component 750 also has a second housing structure 760 that includes a first electrical terminal 770 electrically coupled to the battery 764. The second housing structure 760 is configured to receive the connector assembly 700, which has a second electrical terminal 735, with sufficient mechanical play to enable stress relief related displacement effects between the second housing structure 760 and the connector assembly 700 while maintaining an electrical coupling between the first electrical terminal 770 and the second electrical terminal 735.

Embodiments of the invention find broad applicability in systems providing electricity to devices. Adapters or plugs for various devices that draw electricity and that might need to be connected to a battery source can be configured according to embodiments of the invention. The battery pack component 150 need not be a conventional battery but may be a source of power resembling battery power. While this invention has been particularly illustrated and described with references to example embodiments thereof, it will be understood by those skilled in the art that various changes in form and details may be made therein without departing from the scope of the invention encompassed by the appended claims.

What is claimed:

1. A connector assembly, comprising:
   a plate including an upper surface and a lower surface and defining an opening through the plate, the opening extending between the upper surface and the lower surface to enable passage of an electrical conductor through the plate, the plate oriented plane-perpendicular to a direction of passage of the electrical conductor;
   a connector housing protruding below the lower surface of the plate and defining an interior of the connector housing, the interior defining a socket extending below the opening; and
   a stress relief component coupled to the plate to attenuate a force applied to the stress relief component from the plate in a direction plane-parallel to the plate.

2. The connector assembly of claim 1, further including at least one first electrical terminal in the socket configured to couple electrically with at least one second electrical terminal of a battery pack component while the connector assembly is engaged with the battery pack component.

3. The connector assembly of claim 1, wherein the connector housing component includes multiple connector housing members, each connector housing member including a corresponding electrical terminal.

4. The connector assembly of claim 1, wherein the stress relief component includes multiple stress relievers each in common arrangement above, below, or in a plane of the plate, the socket positioned between the multiple stress relievers.

5. The connector assembly of claim 4, wherein the stress relievers are configured to provide a retention force to maintain the plate in a substantially fixed position in a plane of the plate.

6. The connector assembly of claim 5, wherein the stress relievers are configured to provide the retention force by abutting at least one positioning member on an element adjoining the plate while the connector assembly is engaged with a battery pack component.

7. The connector assembly of claim 1, wherein the connector housing further protrudes above the upper surface of the plate.

8. A battery pack comprising:
a battery pack component; and
a connector assembly, configured to be engaged with the battery pack component,
the connector assembly including:
a plate including an upper surface and a lower surface and defining an opening through the plate, the opening extending between the upper surface and the lower surface to enable passage of an electrical conductor through the plate, the plate oriented plane-perpendicular to a direction of passage of the electrical conductor; and
a stress relief component configured to attenuate a force from the connector assembly, in a direction plane-parallel to the plate, in a manner maintaining a position of the connector assembly relative to the battery pack component and to mitigate a potential for disruption in electrical connectivity of an electrical interface between the connector assembly and the battery pack component while the connector assembly is engaged with the battery pack component.

9. The battery pack of claim 8, wherein the stress relief component includes multiple stress relievers each in common arrangement above, below, or in a plane of the plate.

10. The battery pack of claim 9, wherein the stress relievers are configured to provide a retention force to maintain the connector assembly in a substantially fixed alignment relative to the battery pack component.

11. The battery pack of claim 8, wherein the connector assembly includes at least one first electrical terminal configured to couple electrically with at least one second electrical terminal of the battery pack component to provide electricity to an electrical interface between the first and second electrical terminals.

12. The battery pack of claim 8, wherein the battery pack component includes a chamfer to align the connector assembly with the battery pack component during engagement of the connector assembly with the battery pack component.

13. A battery pack component comprising:
a first housing structure configured to secure a battery; and
a second housing structure including a first electrical terminal electrically coupled to the battery, the second housing structure configured to receive a connector housing of a connector assembly, including a second electrical terminal, with mechanical play to enable stress relief related displacement effects between the second housing structure and the connector assembly while maintaining an electrical coupling between the first and second electrical terminals, the connector assembly including:
a plate including an upper surface and a lower surface and defining an opening through the plate, the opening extending between the upper surface and the lower surface to enable passage of an electrical conductor through the plate, the plate oriented plane-perpendicular to a direction of passage of the electrical conductor; and
a stress relief component coupled to the plate to attenuate a force applied to the stress relief component from the plate in a direction plane-parallel to the plate.

14. The battery pack component of claim 13, wherein the second housing structure further includes a chamfer to align the connector assembly with the battery pack component automatically during engagement of the connector assembly with the battery pack component.

15. The battery pack component of claim 13, wherein the displacement effects of mechanical shocks or other mechanical motions to the connector assembly or the battery pack component are attenuated relative to the battery by stress relievers on the connector assembly that abut at least one positioning member.

16. The battery pack component of claim 15, wherein the battery pack component has the at least one positioning member integrated therewith.

17. The connector assembly of claim 1, wherein the interior defines the socket through which the electrical conductor may be routed, the socket extending below the opening and enabling an electrical connection to be established based on the connector housing being inserted into a cavity configured to receive the connector housing.

18. The battery pack of claim 8, wherein the connector assembly further includes a connector housing protruding below the lower surface of the plate and defining an interior of the connector housing, the interior defining a socket extending below the opening through which the electrical conductor may be routed, the socket extending below the opening and enabling an electrical connection to be established based on the connector housing being inserted into a cavity configured to receive the connector housing.

19. The battery pack component of claim 13, wherein the connector assembly further includes a connector housing protruding below the lower surface of the plate and defining an interior of the connector housing, the interior defining a socket through which the electrical conductor may be routed, the socket extending below the opening and enabling an electrical connection to be established based on the connector housing being inserted into a cavity of the battery component configured to receive the connector housing.

* * * * *